Aug. 8, 1933.  E. S. CARPENTER  1,921,215
MOTION PICTURE PROJECTOR
Filed May 10, 1932
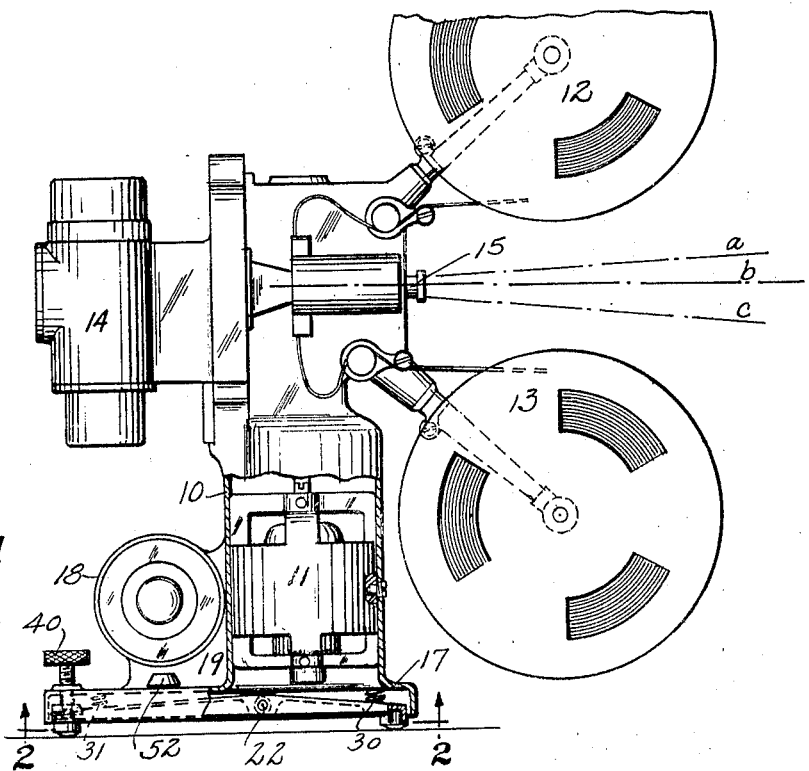
FIG. 1
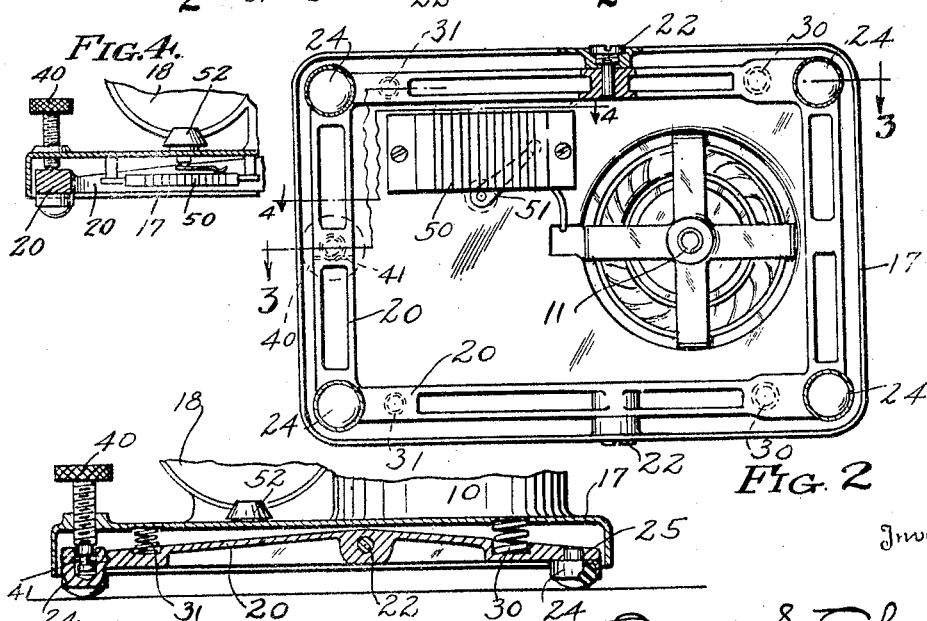
FIG. 4
FIG. 2
FIG. 3
Inventor
Ernest S. Carpenter,
By Bates, Golnick & Fears
Attorneys Patented Aug. 8, 1933

1,921,215

UNITED STATES PATENT OFFICE 1,921,215

MOTION PICTURE PROJECTOR

Ernest S. Carpenter, Cleveland Heights, Ohio, assignor to The Augustus-Carpenter Company, Cleveland, Ohio, a Corporation of Ohio Application May 10, 1932. Serial No. 610,420

12 Claims. (Cl. 88—17)

This invention is concerned with means in a motion picture projector for positioning the image on the screen. More particularly, the invention provides a simple mechanism at the base of the projector frame for tipping the projector slightly in one direction or the other, thus swinging the axis of the lens up or down to properly center the picture in a vertical direction. Horizontal centering being readily effected by properly positioning the projector on a support, it follows that with my vertical tipping device the picture may be caused to occupy any portion of the screen desired.

To accomplish the tipping readily and still enable the projector to be firmly held in any set position, I provide a sub-base intermediately pivoted on a transverse axis within a hollow base of the projector frame; a suitable screw connects the sub-base with the projector frame, and thus enables the rocking of the projector frame in one direction or the other on the sub-base, and springs, between the sub-base on each side of its axis and the projector frame itself, prevent any loose movement.

It is very convenient in making the projector to have the motor and other mechanism over the forward portion of the base, rather than directly over the center. I compensate for this by providing heavier springs at the front of the sub-base axis than at the rear, so that the machine is approximately balanced on the pivotal axis of the sub-base; and thus very little effort is required in turning the adjusting screw to tip the machine.

My invention is illustrated in the drawing hereof, and is hereinafter more fully explained and the essential and novel characteristics are summarized in the claims.

In the drawing:

Fig. 1 is a sectional side elevation of a motion picture projector having my adjustable sub-base.

Fig. 2 is a bottom plan of the projector.

Figs. 3 and 4 are vertical sections through the sub-base and the base of the projector frame, as indicated by the offset lines 3—3 and 4—4 respectively on Fig. 2.

In the drawing, 10 indicates a hollow vertical frame which houses the motor 11 and the transmission mechanism driven thereby; 12 and 13 indicate the two reels; 14 the lamp housing and 15 the lens barrel. The frame terminates in a hollow downwardly facing rectangular base 17. The barrel portion 10 of the frame is shown as rising from the forward part of the base 17 and at the rear of such barrel frame is a housing 18 for the main switch, this housing being connected with the barrel 10 and the base 17 by webs 19.

Mounted within the recess of the hollow rectangular base 17 is the sub-base 20 which is in the form of a comparatively light rectangular border frame. It is pivoted to the base 17 by pivot pins 22 screwed into the flanges of the base 17 extending horizontally beyond the member 20. This flanges into openings in the member 20. This member 20 carries at each of its four corners downwardly facing cups 24 in which rubber feet may be mounted. These cups are shown in Fig. 3 as being secured by means of studs 25 on the cups engaging openings in the sub-base 20.

Between the sub-base 20 and the frame base 17 are four springs 30 and 31, each occupying an upwardly facing recess in the sub-base and a downwardly facing recess in the base 17 as shown in Fig. 3. The two springs 30 at the front of the pivots 22 are comparatively heavy; while the two springs at the rear of the pivots are comparatively light; and thus the forward springs tend to counterbalance the greater weight of the projector in front of the pivot 22, so that the machine is more or less balanced on the pivotal support.

Tipping of the projector is effected by a screw 40 which is threaded into the base 17 and its lower end is swivelled to the rear transverse member of the frame 20. As shown, the swivelling is effected by a pin 41 set into the member 20 and occupying a portion of an annular groove in the screw 40.

It will be seen that as the screw 40 is turned in, it serves to raise the rear portion of the base 17, and thus tip the projector frame forwardly, tipping the lens barrel downwardly. The more the screw is turned in, the more the barrel is tipped; so that the lens axis may pass from the horizontal direction (indicated by the line b in Fig. 1) to the diagonal downward position indicated by the line c. On the other hand, if the screw 40 is turned in the opposite direction (i. e. out of the base 17) this lowers the rear of the base and thus tips up the lens barrel into an upwardly inclined direction as indicated by the line a on Fig. 1.

It will be seen from the above description that I have provided a very simple means for tipping the axis of the lens barrel upwardly or downwardly, as may be desired to position the picture. At the same time, the sub-base, by which this is accomplished, very firmly supports the projector in whatever position may be given to it.

By making the sub-base in the form of an open border frame, as shown clearly in Fig. 2, considerable space is available beneath the base plate 17 and within such border frame. I avail myself of such open space for mounting the controlling rheostat 50, which is adjusted by a rock arm 51 having a vertical shaft carrying an external operating knob 52. The open border frame construction also permits the removal of the motor through the opening in the sub-base. This permits renewal of the motor brushes or replacement of the motor without first removing the sub-base.

The open base maintains the machine elevated from its support as indicated in Fig. 1, and thus provides space for the passage of cooling air beneath the edge flanges of the base proper and across the rheostat and through the motor. It will be noticed also that the rocking frame is housed almost entirely within the flange of the main base 17, and hence is not visible to any material extent. This contributes to the general neatness of the projector, and is an advantage where the machine is intended for household use.

I claim:

1. In a motion picture projector, the combination of a frame having a substantially rectangular base with downward edge flanges, a sub-base housed within the boundary of said flanges and intermediately pivoted on a transverse axis, and means for rocking the main frame on the sub-frame and holding it in any desired position.

2. In a motion picture projector, the combination of a main frame carrying the reels, lamp and lens and terminating in a hollow rectangular base opening at the bottom, a sub-base mounted within the recess of the frame base intermediately pivoted on a transverse axis, said sub-base having feet at the four corners adapted to rest on its support, and a screw for adjusting the relation of the main frame to the sub-base.

3. In a motion picture projector, the combination of a main frame carrying the reels, lamp, lens and operating mechanism, of a sub-base intermediately pivoted to the main frame, springs between the sub-base and main frame on opposite sides of the pivot, and a screw adapted to rock the main frame on the sub-base and hold it in definite position.

4. In a motion picture projector, the combination of a main frame carrying the reels, lamp, lens and driving mechanism and terminating in a hollow rectangular base opening at the bottom, a sub-base mounted within the recess of the frame base and intermediately pivoted thereto on a transverse axis, springs between the sub-base and main frame respectively in front of and behind the pivotal axis, and means for tipping the main frame on the sub-base.

5. The combination of a motion picture projector having a projecting lens carried by an upright hollow frame which houses the motor and driving mechanism, said upright frame terminating in a laterally projecting substantially horizontal base, a sub-base in the form of a substantially horizontal open border frame pivotally connected to the main frame, means for rocking the main base on the sub-base and holding it in a selected position, the main base having an opening through it communicating with the hollow upright portion, whereby air may pass through the openings of both bases to the motor.

6. The combination of a motion picture projector having a projecting lens carried by an upright hollow frame which houses the motor and driving mechanism, said upright frame terminating in a substantially horizontal base with an edge flange extending downwardly, a sub-base in the form of an open border frame mounted within the main base on a pivotal axis extending transversely, means for rocking the main base on the sub-base and holding it in a selected position, a rheostat for controlling the motor mounted on the under side of the main base within the open space of the sub-base.

7. In a motion picture projector, the combination of a main frame having a base portion and an upright portion eccentric of the base portion, a substantially horizontal lens barrel carried by the upright portion, a sub-base intermediately pivoted to the frame, springs between the sub-base and the main frame on opposite sides of the pivotal axis, the springs in the region corresponding to the upright frame being stronger than those on the opposite side of the axis, and means for swinging the main frame on the sub-frame in opposition to the springs on one side of the pivotal axis.

8. In a motion picture projector, the combination of a main frame having a base portion, a hollow housing rising from the base portion nearer one end thereof than the other, a motor mounted within the hollow housing, a lens carried by the upright frame, a sub-base intermediately pivoted to the main base and springs between the sub-base and the main base, both in front of and behind the pivotal axis of the sub-base, the springs on that side of the axis where the upright frame is principally located being stronger than the springs on the other side.

9. In a motion picture projector, the combination of a main frame carrying the reels, lamp housing, lens and driving mechanism and terminating in a substantially horizontal base with downwardly projecting edge flanges, a sub-base within the boundary of said edge flanges and pivoted to opposite flanges on an intermediate transverse axis, such sub-base being of hollow form and having side arms and end arms and having feet at its four corners, two pairs of springs between the main base and the side arms of the sub-base, one pair in front of and one pair behind the pivotal axis of the sub-base, and means for adjusting the relation of the main frame to the sub-base by swinging the main frame in one direction or another on said axis.

10. In a motion picture projector, a main frame having a base portion, a sub-base, means interconnecting the sub-base with the frame base, and wherein said last-named means include a pivotal connection arranged to permit the rear and foremost lower edges of the frame base to be alternately moved towards and away from the projector supporting surface.

11. In a motion picture projector, a main frame having a horizontally extending base portion and an upstanding hollow column to support the projector mechanism, a sub-base pivotally mounted on the frame base and arranged to support the main frame, means including a pivotal connection between the sub-base and the main frame to tilt the main frame relative to the projector supporting surface, said sub-base including a border-like frame provided with an opening therein arranged vertically below the hollow column, a motor arranged to be inserted through such opening and positioned within the hollow column, and means to secure the motor to the frame in a position above the plane of the sub-base.

12. In a motion picture projector, the combination of a main frame carrying the reels, motor, lamp, and projecting lens, and having a laterally extending base portion with downward edge flanges, a sub-base housed within the boundary of said flanges and pivoted to said base portion, and means for rocking the main frame on the sub-frame and holding it in any desired position.

ERNEST S. CARPENTER.